United States Patent
McGuyer

(10) Patent No.: US 7,681,763 B2
(45) Date of Patent: Mar. 23, 2010

(54) CONDIMENT DISPENSING CONTAINER

(75) Inventor: Carter W. McGuyer, Muscle Shoals, AL (US)

(73) Assignee: Fox Run USA, LLC, Ivyland, PA (US)

( * ) Notice: Subject to any disclaimer, the term of this patent is extended or adjusted under 35 U.S.C. 154(b) by 1109 days.

(21) Appl. No.: 11/281,960

(22) Filed: Nov. 16, 2005

(65) Prior Publication Data

US 2006/0076369 A1    Apr. 13, 2006

Related U.S. Application Data

(63) Continuation-in-part of application No. 10/829,174, filed on Apr. 22, 2004, now Pat. No. 7,320,415, and a continuation-in-part of application No. 10/699,234, filed on Oct. 31, 2003, now Pat. No. 7,083,070.

(60) Provisional application No. 60/467,815, filed on May 2, 2003.

(51) Int. Cl.
 *B65D 35/38* (2006.01)
 *B67D 3/00* (2006.01)

(52) U.S. Cl. .................. 222/499; 222/483; 222/507; 222/509; 222/523

(58) Field of Classification Search .......... 222/480, 222/481, 483, 499, 503, 507, 509, 523, 540, 222/559
 See application file for complete search history.

(56) References Cited

U.S. PATENT DOCUMENTS 2,721,004 A * 10/1955 Schultz .................. 222/92

| | | |
|---|---|---|
| 4,700,850 A | 10/1987 | Morgan et al. |
| 5,490,615 A | 2/1996 | Robbins et al. |
| D392,852 S | 3/1998 | Weterrings et al. |
| D402,849 S | 12/1998 | Weterrings et al. |
| D403,923 S | 1/1999 | Weterrings et al. |
| D407,610 S | 4/1999 | Weterrings et al. |
| 5,931,356 A | 8/1999 | Lillelund et al. |
| 6,182,839 B1 | 2/2001 | Robbins et al. |
| 6,283,339 B1 | 9/2001 | Morrow |
| 6,308,838 B1 | 10/2001 | Endean |
| D464,533 S | 10/2002 | McGuyer |
| 6,591,993 B2 | 7/2003 | Humphrey |

FOREIGN PATENT DOCUMENTS

GB    3002855    4/2002

OTHER PUBLICATIONS

Handy Spice Instructions Brochure.

* cited by examiner

*Primary Examiner*—Frederick C. Nicolas
*Assistant Examiner*—Melvin A Cartagena
(74) *Attorney, Agent, or Firm*—Gregor N. Neff, Esq.

(57) ABSTRACT

Substantially cylindrical condiment container with a vertically sliding cap to cover and uncover a dispensing outlet opening in the top portion of the container. Preferably, the outlet opening is in the side wall of the container body and the cap slides up to unblock the opening and down to block it. Optionally, a rotary pre-measuring dispense structure can be located at the lower end of the container to dispense condiments in pre-measured increments through an outlet in the bottom of the container.

7 Claims, 8 Drawing Sheets

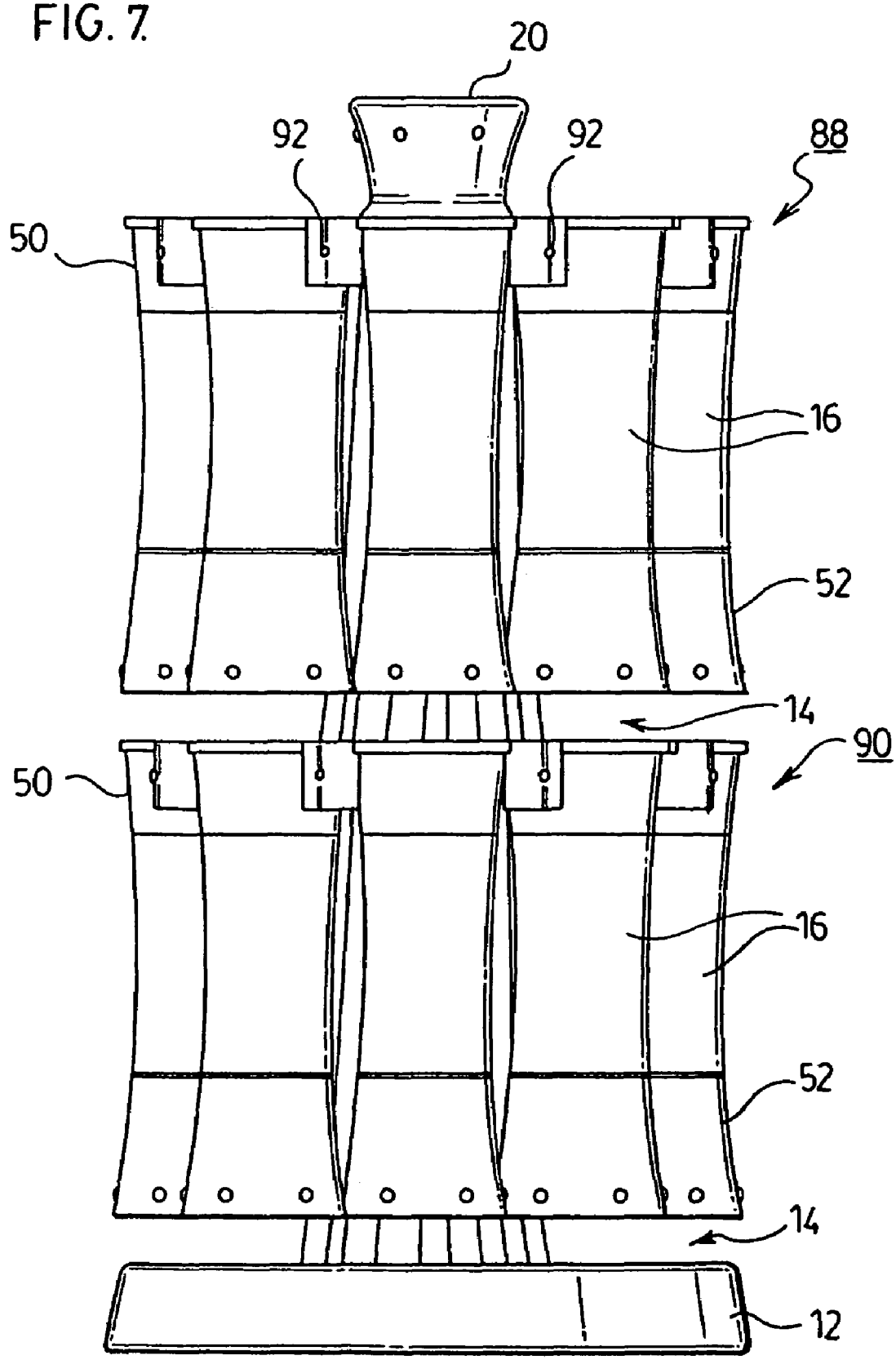

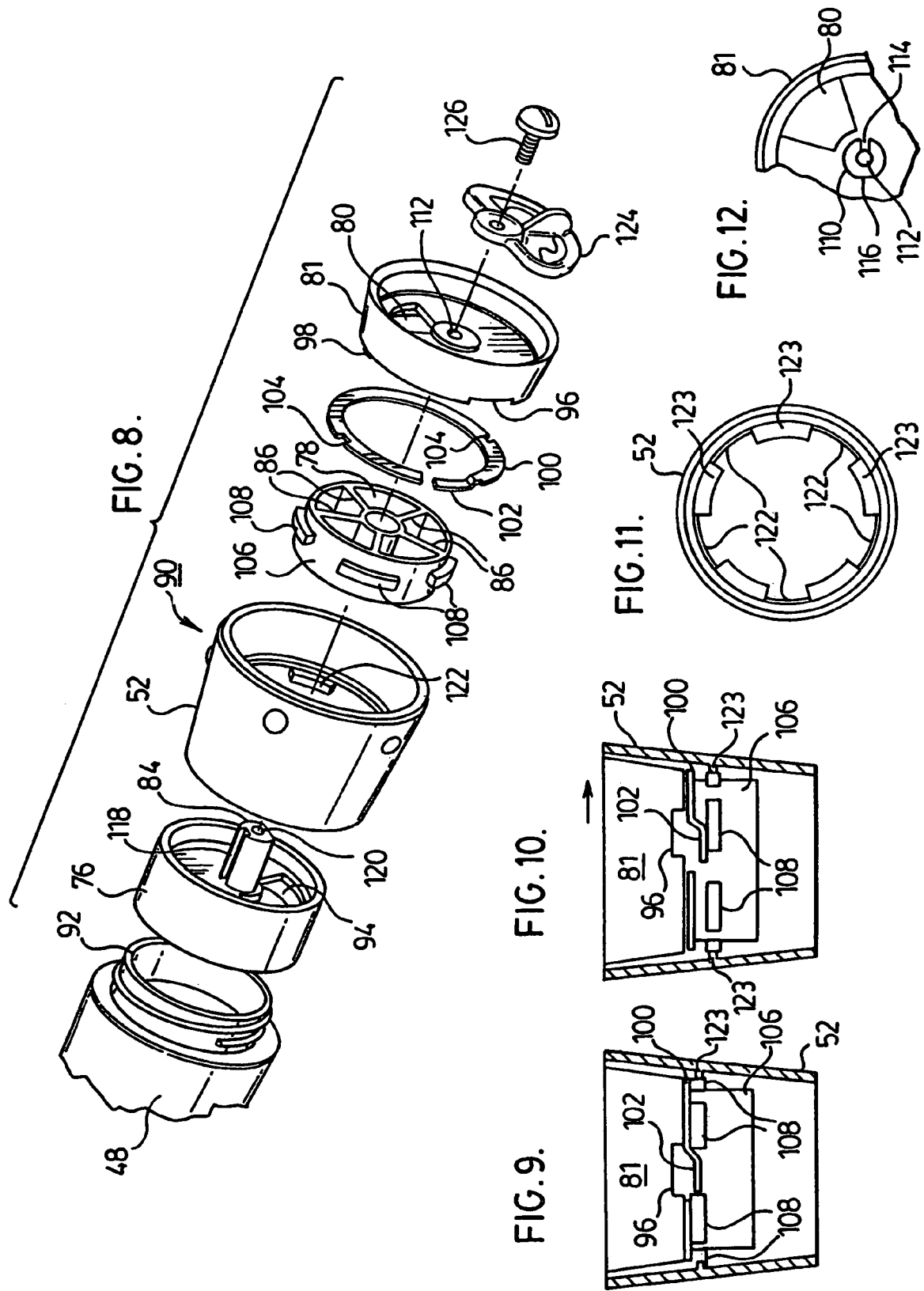

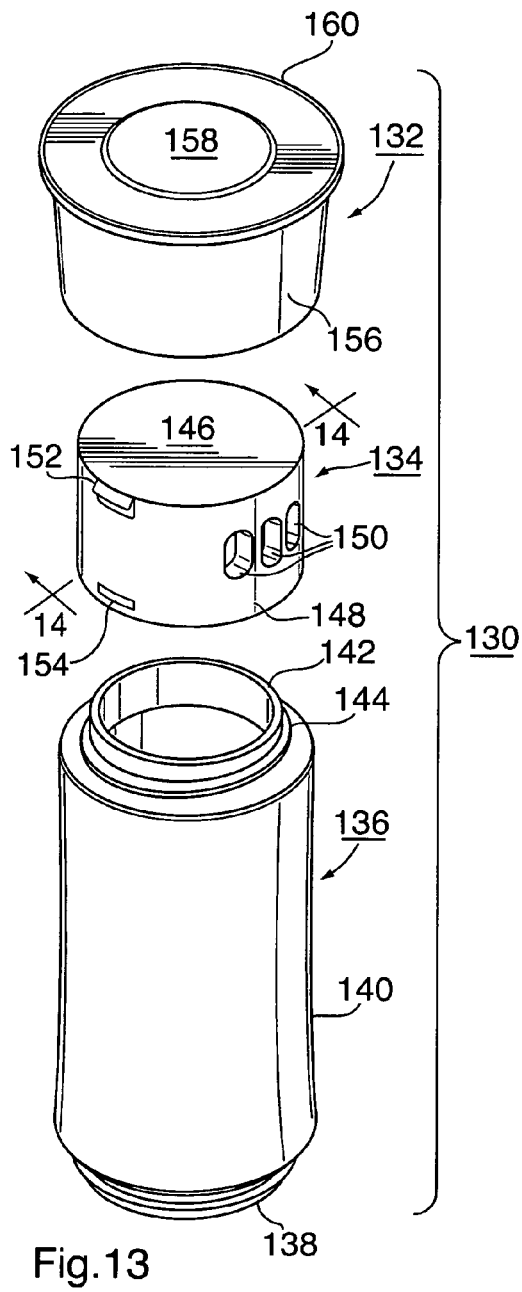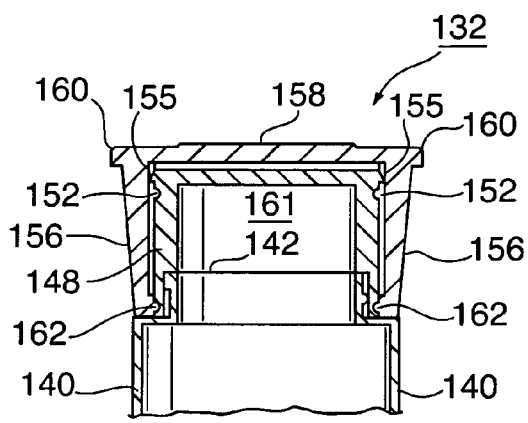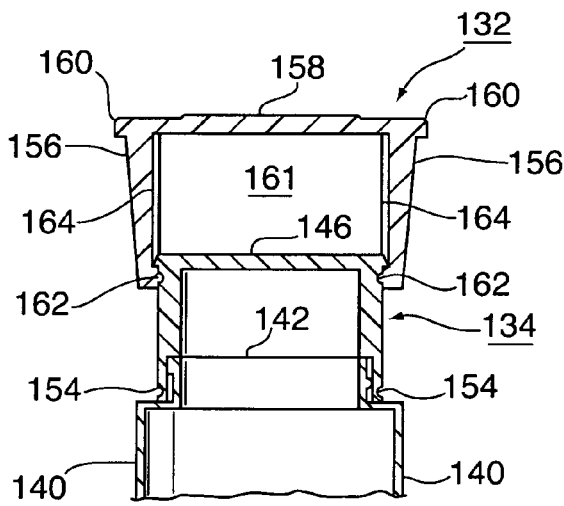
Fig. 13
Fig. 14
Fig. 15

CONDIMENT DISPENSING CONTAINER

Priority is claimed from U.S. Provisional Patent Application Ser. No. 60/467,815, filed May 2, 2003. This application is a continuation-in-part of U.S. patent application Ser. No. 10/829,174, filed Apr. 22, 2004, now U.S. Pat. No. 7,320,415, and of Ser. No. 10/699,234, filed Oct. 31, 2003 now U.S. Pat. No. 7,083,070.

This invention relates to dispensing containers, and particularly to condiment dispensing containers, and to carousels for storing and organizing such containers.

Condiment dispenser carousels such as those sold by the assignee of this patent application have become very popular. Such carousels store different spices in wedge-shaped dispensing containers which can be used to dispense automatically pre-measured quantities through the bottom, or unmeasured quantities through openings in the top.

It is an object of the present invention to provide a device of the same type which uses dispensing containers of a shape and size which makes them especially easy to handle.

It is another object to provide such dispensing containers are relatively simple in construction and easy to use.

It is another object of the invention to provide a carousel device which is relatively sturdy and yet inexpensive to manufacture.

It is a further object of the invention to provide a dispensing container which is suitable not only for use with a carousel for storing it, but also as an easy-to-use stand-alone condiment dispenser for use on the table or elsewhere, wherever needed.

It is a further object of the invention to provide a carousel device which easily can be stacked on top of another carousel and locked in place without the use of tools or extra components.

In accordance with the present invention, the foregoing objects are satisfied by the provision of a dispensing container and carousel in which the container has an upper dispensing opening opened and closed by vertical movement of a sliding cap.

The container can have a substantially cylindrical shape, instead of the more usual wedge shape, and is relatively easy to handle. The container can be used easily as a stand-alone condiment dispenser on the table or wherever needed. It can be used in many combinations with other dispensers, such as a pepper mill made to look like the dispenser, etc.

The container preferably has an upper outlet opening, preferably in the upper side wall of the container, which can be used to pour out the contents of the container from the top. The outlet opening can be closed and opened by vertical movement of a sliding cap. The cap is easy to grasp and quick to use. The container top structure can be unscrewed to remove it to facilitate re-filling or dipping into the contents with a measuring spoon, etc. The top of the container is wider than the main body of the container so as to facilitate hanging the container from support arms on a carousel.

The container optionally has a pre-measured dispensing mechanism which can be rotated simply by turning a portion of the body of the container. No additional levers or knobs are needed.

The container also has a construction which is relatively simple to manufacture and is durable to resist wear and give long service.

The carousel construction is reduced in cost by the provision of a plurality of upstanding struts or rods which are used to form a central projection for rotatably supporting the container.

The carousel unit is made easily stackable with one or more other carousel units. This is done by using a first locking mechanism to releasably attach the central projection of the carousel to the base member, and providing a second locking mechanism at the top of the central projection. The base member from one unit is removed and its central projection is locked into the upper locking mechanism of the other unit. This permits the units to be stacked atop one another without the use of tools or extra parts.

The foregoing and other objects and advantages of the invention will be set forth in or apparent from the following description and drawings.

IN THE DRAWINGS

FIG. 7 is a front elevation view of a pair of carousels of the type shown in FIG. 1 stacked and attached together;

FIG. 8 is an exploded perspective view of another dispensing mechanism of the present invention;

FIGS. 9 and 10 are cross-sectional views of a portion of the mechanism shown in FIG. 8, with the mechanism in different operative positions;

FIG. 11 is a bottom plan view of one part of the mechanism of FIG. 8;

FIG. 12 is a broken-away top plan view of a component of the FIG. 8 structure;

FIG. 13 is an exploded view of another embodiment of the condiment dispensing container of the invention; and FIGS. 14 and 15 are cross-sectional views, partially broken-away, taken along line 14-14 of FIG. 13, showing the top of the container in two difference operative positions.

GENERAL DESCRIPTION

Figure 1:
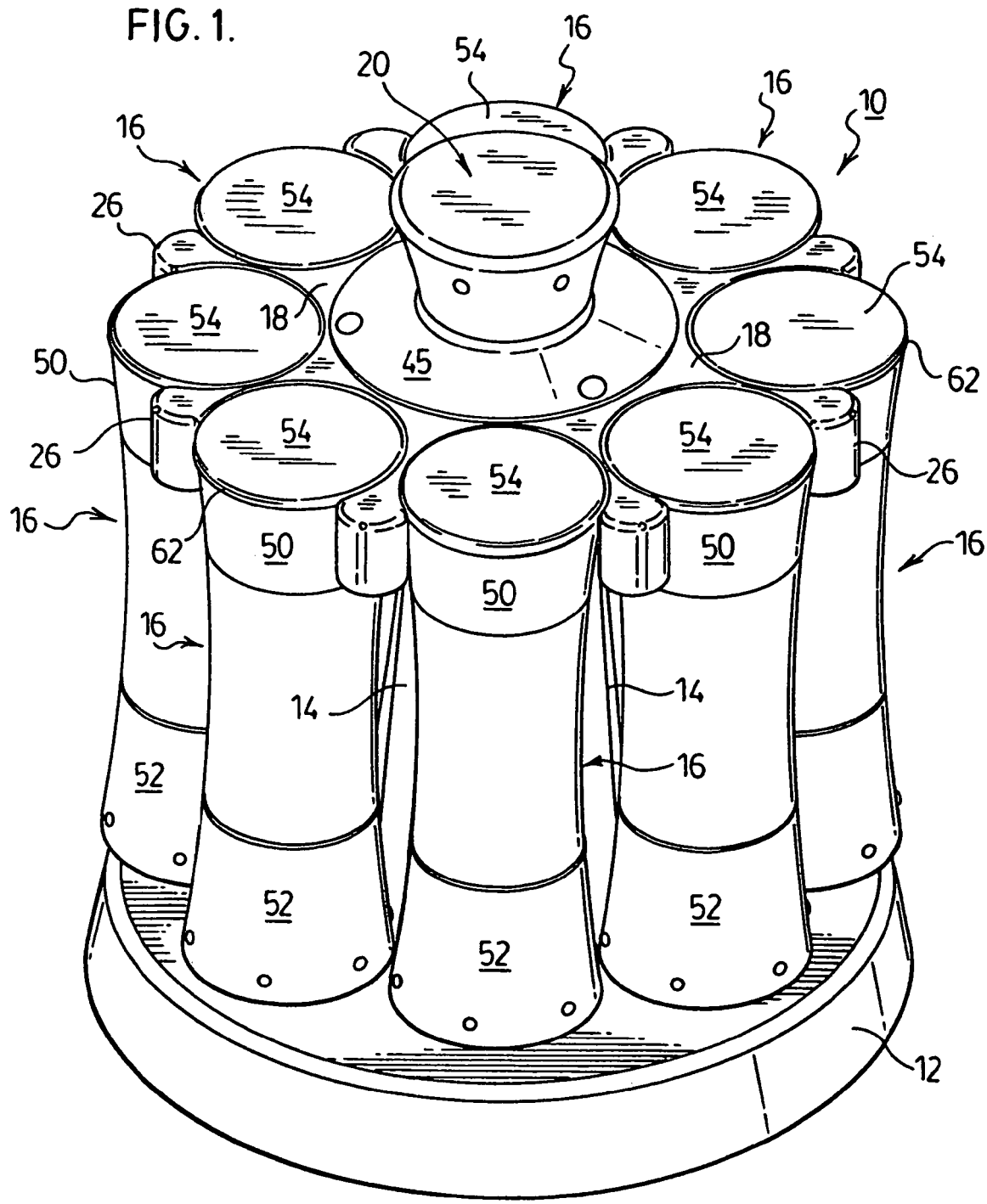
FIG. 1 is a perspective view of the preferred embodiment of the present invention.

FIG. 1 shows the condiment dispensing carousel 10 of the present invention. The carousel includes a base member 12, and a plurality of rod-shaped vertical struts 14 arranged in a circular pattern to form a central vertical projection from the base member 12. Several dispensing containers 16 are supported on a holding structure 18 which is rotatably mounted on the central projection so that the containers can be rotated to facilitate location of a desired container.

A handle structure 20 is secured to the holding structure 18 to provide a means for easily lifting the carousel.

Figure 2:
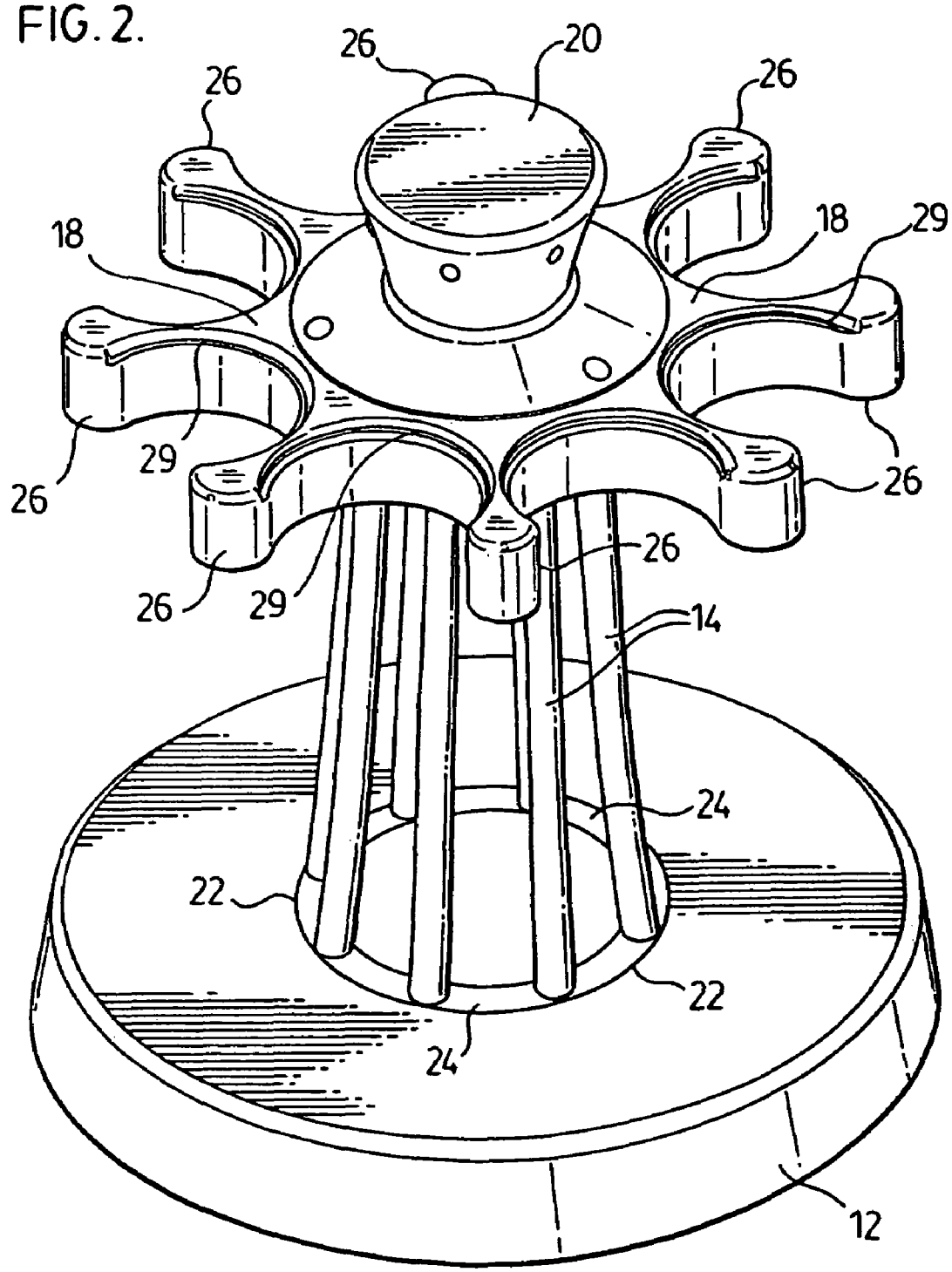
FIG. 2 is a perspective view of the structure of FIG. 1 with the dispensing containers removed.

Referring now to FIG. 2, the carousel structure includes a ring 24 securing the lower ends of the struts 14 together. The ring is fastened to the base 12 by means of a releasable locking structure including a circular groove 22 in the base member 12 with locking tab receptacles 27 (FIG. 3), and locking tabs 25 on the ring 24 which fit into the receptacles when the ring 24 is inserted into the groove 22 and twisted. This locks the central projection to the base.

Figure 3:
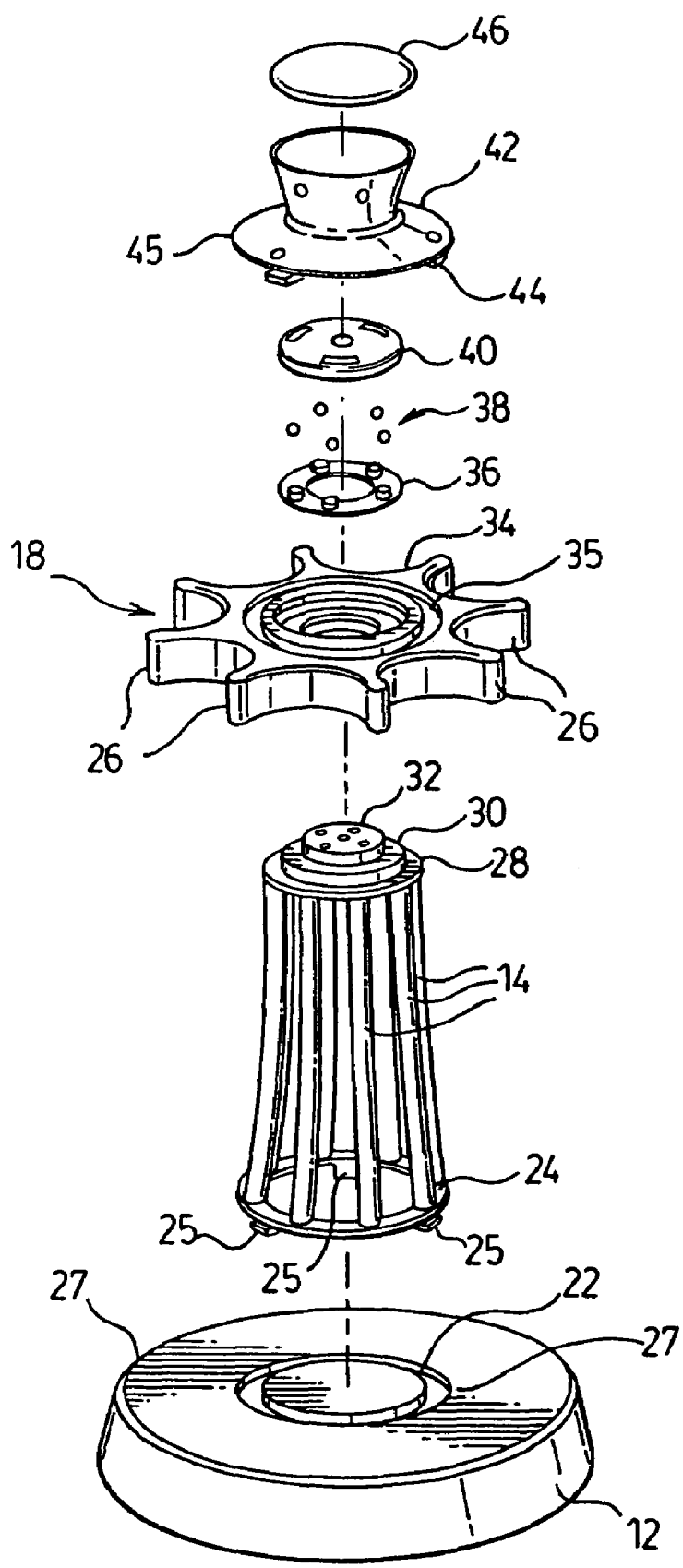
FIG. 3 is an exploded view of the structure of FIG. 2.

Still referring to FIG. 3, another ring 28 attaches the upper ends of the struts 14 together and forms concentric bearing and mounting surfaces 30 and 32.

As it is shown in FIG. 2, the dispensing container holder 18 has a plurality of radial arms 26 forming approximately semicircular recesses with an indented groove 29 around the upper edge of each recess.

Referring again to FIG. 3, the holder 18 includes a central hub 34, a ballbearing race 36 and ballbearings 38, and a retainer plate 40 which is used to hold the ballbearings, the hub 34 and the structure at the top of the struts 14 together so that the holder 18 can rotate smoothly on the ball bearings to easily rotate the dispensing containers into position.

In the upper surface of the holder 18 is a groove 35 of the same shape as the groove 22 in the base and having lock tab receptacle openings like the openings 27 in the groove 22.

The handle structure includes a base 42 with a flange 45 and lock tabs 44 which fit into the groove 34 and can be rotated to lock the handle in place. A cap 46 is fastened to the upper surface of the handle structure.

When the parts are assembled together, the container holder 18 rotates smoothly on the central projection.

Dispensing Container

Figure 4:
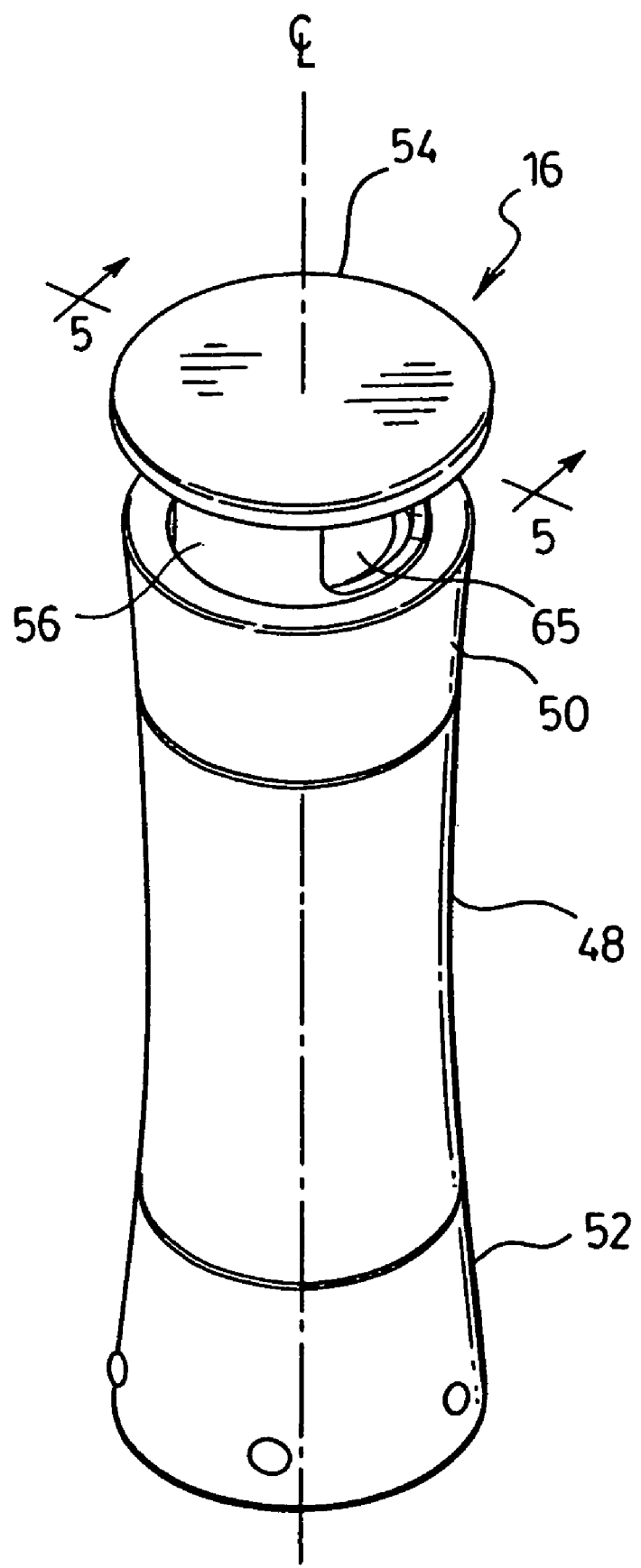
FIG. 4 is a perspective view of one of the containers shown in FIG. 1, with its retractable spout structure raised for use.

Referring now to FIGS. 1 and 4, each of the dispensing containers 16 is of a generally cylindrical shape, with a upper portion 50, a lower portion 52, a transparent side wall portion 48 (FIG. 4), and a cap 54 at the top of the upper portion 50.

As it is shown in FIG. 4, the cap 54 is attached to a slider structure 56 with a dispensing outlet opening 60 when the cap 54 is pulled upwardly as shown in FIG. 4.

When the slider structure is retracted, the opening 60 is closed and the cap 54 covers the entire upper surface of the container.

Figure 5:
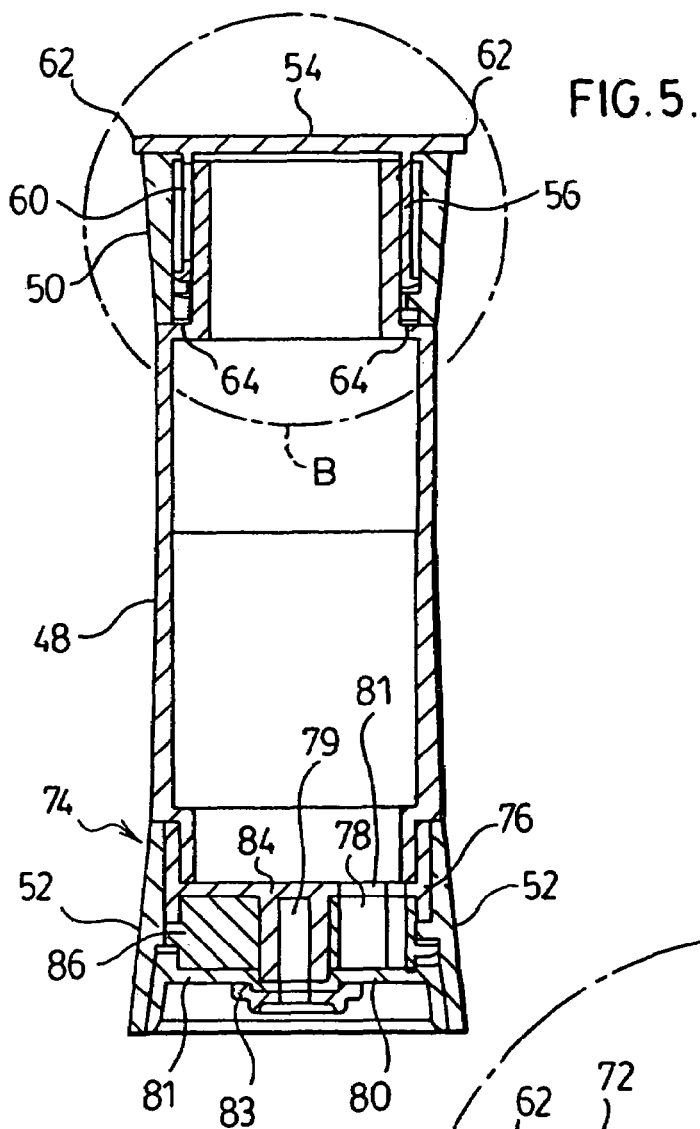
FIG. 5 is a cross-sectional view taken along line 5-5 of FIG. 4, but with the spout structure retracted.
Figure 6:
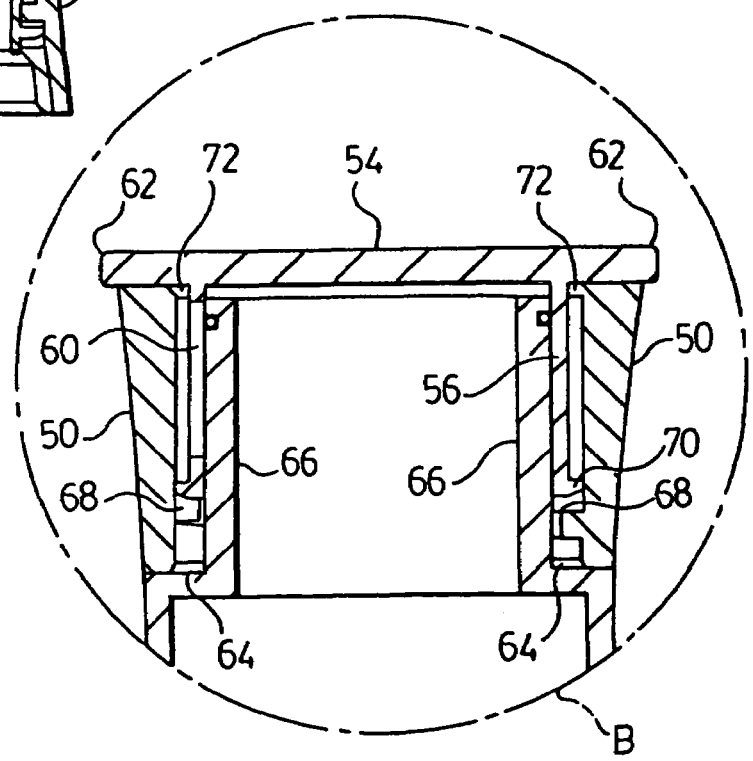
FIG. 6 is an enlarged representation of the portion of the structure of FIG. 5 encircled by the line B.

The dispensing container construction is shown in greater detail in the cross-sectional views of FIGS. 5 and 6.

As it is shown in FIG. 5, the upper portion of the body of the container is inset as shown at 64. A tapered outer ring 50 is fastened to screw threads 68 (see FIG. 6) to fasten it in place. The diameter of the ring 50 is larger than the diameter of the outer wall 66 of the upper inset portion of the container, so as to form an annular space between the inner surface of the ring 50 and the outer surface of the wall 66.

Into that space is fitted the slider structure 56. The slider structure has an outwardly-extending ridge 70 at its bottom edge which bears against the inner surface of the outer ring 50, and the upper inner edge of the ring 50 has an inwardly-extending flange 72 against which the slider 56 also bears. The container and the carousel preferably are molded of plastic materials with some flexibility.

Thus, when the slider 56 is pulled upwardly, with moderate force, the ridge 70 engages the flange 72 and acts as a detent to hold the cap and the slider in the extended position without allowing the slider to be removed completely from the container body.

Screw threads (not shown) are provided to allow the removal of the cap and the slider from the top of the container completely. This allows ready access to the inside of the container for refilling it, for dipping out contents with a spoon inserted through the large opening thus formed, or for pouring out large quantities of materials.

The structure shown also has the advantage that it minimizes the possibility of condiments entering into the area where the slider slides, and thus avoids interference with the operation due to accumulated matter in the sliding mechanism.

The outer edge 62 of the cap 54 extends beyond the outwardly tapered ring 50. This provides a ridge which fits into the groove 29 in the holding structure 18 (see FIG. 2) to hold the containers in position on the holding structure.

The container-receiving recesses shown in FIG. 2 are made slightly more than half-circles to improve the holding of the containers.

Again referring to FIG. 5, the dispensing mechanism is indicated at 74. The dispensing structure includes a plurality of vertical panels 86 which form separate radial compartments 78 around a central axis 79. A structure 76 with a post 84 is secured in a recess in the lower portion of the housing body. A gate plate 81 is secured by a screw and washer 82 to the post 84. Plate 81 covers the bottoms of the compartments 78 but has a single hole 80 the size of one compartment. The panels 86 are secured to the ring 52. Rotation of the ring 52 moves the compartments 78 sequentially past the outlet opening 80 to dispense the pre-measured contents of the compartments, and past a hole 81 in the upper wall of the structure 76 to re-fill the compartments. The openings 80 and 81 are spaced from one another circumferentially.

The rings 50 and 52 are faired with the remainder of the housing to give it a smooth appearance.

The dispensing mechanism 74 is otherwise well known and will not be further described here. However, it operates to dispense, with each increment of rotation, the contents of one of the compartments 78 so as to deliver a pre-measured quantity of condiment through the bottom opening of the dispensing container.

The container can be used to dispense pre-measured quantities using the dispensing mechanism at the bottom, or the retractable spout can be used to pour the condiments from the container. If desired, other dispensing openings can be used. For example, slits or multiple small holes can be provided in a portion of the slider 56 of the container 16 opposite the opening 60 so as to give the user the option of a shaker outlet or a pouring outlet.

Preferred Dispensing Mechanism

FIGS. 8 through 12 show a preferred dispenser mechanism 90 for use with the dispensing container described above. It is similar to that shown in FIGS. 4-6 above, and the same reference numerals are used for corresponding parts in the two mechanisms.

FIG. 8 is an exploded view of the dispenser mechanism 90. The lower end of the housing body 48 has a outlet extension of reduced diameter having screw threads 92. The structure 76 has internal screw threads (not shown) which mate with the threads 92 so that the structure 76 can be secured firmly in place merely by turning it onto the threads 92.

The ring 52 fits over the outside of the structure 76 and is mounted rotatably on the post 84 by the mechanism which is to be described below.

The dividers 86 forming the compartments 78 are part of a thermoplastic molded structure 106 with five radially-extending projections 108 distributed around the periphery of the ring 106. The projections 108 a have curved edges and are dimensioned so that when the ring 106 is pushed into the ring 52, the projections 108 fit tightly into notches 122 (see FIG. 11.) in the ring 52 so that the two parts are snugly engaged with one another. As it is shown in FIGS. 9 and 10, a portion of each projection 108 extends above the tabs 123 which form the notches 122 so as to form recesses between adjacent projections. These are used as detent recesses, as it is explained below.

The additional tapered ring 81 having the dispensing opening 80 has, on its left edge, a notch 96 and two small projections 98 (only one of which is shown in FIG. 8) located 180° from one another.

A stainless steel split ring-shaped spring 100 is positioned between the left edge of the member 81 and the projections 108 on the element 106.

FIG. 12 is a broken-away view of the upper face of the member 81. The upper face is not visible in FIG. 8. The upper face of the ring 81 has a central recess 110 with a flat portion 116 and a short spline 114, as well as a central hole 112. A screw 126 is inserted through the hole 112 and threaded into a hole 120 in the post 84 (see FIG. 8) to hold the components of the dispensing mechanism together.

As it is shown in FIG. 8, the post 84 has a flat portion 120 matching the flat 116 and a spline-receiving axial groove 118 which receives the spline 114. Thus, the tip of the post 84 fits into the hole 110 shown in FIG. 12 so as to tightly secure the part 81 to the post and prevents it from rotating.

A gate member 124 is rotatably attached by means of the screw 126 to the member 81. The gate member 124 can be rotated to cover or uncover the dispensing outlet 80 so that the user of the dispenser can cover the outlet opening when desired in order to aid in keeping the contents of the dispenser fresh.

The stainless steel ring 100 has a pair of opposed notches which mate with the projections 98 on the unit 81 so as to rotatably secure the unit 81 and the spring 100 together.

The spring 100 is split, and has one end 102 which is offset from the remainder of the ring, as it is shown more clearly in FIGS. 9 and 10. The ring 100 serves three different functions.

First, the mechanism makes a "click" when the mechanism goes from one dispensing position to the next one.

Secondly, the mechanism accurately aligns the outlet opening 80 with one of the compartments 78 to empty the contents of that compartment accurately.

Third, it operates as a ratchet mechanism to prevent the rotation of the dispensing mechanism in the wrong direction.

FIG. 9 is a cross-sectional view of an assembly including the rings 52, 106 and 81. The bent portion 102 of the spring 100 is aligned with the notch 96 in the ring 81 so as to give it clearance for moving upwardly and downwardly.

When the outlet opening 80 is correctly aligned with one of the outlet compartments 78, as shown in FIG. 9, the bent portion 102 of the spring 100 fits into the gap between adjacent projections 108. This assures accurate alignment of the outlet opening with each of the compartments in succession.

Additionally, when in this position, the spring portion 102 will prevent rotation of the dispensing mechanism in the wrong direction because the left edge of the portion 102 bears against one of the projections 108. Thus, the spring 102 performs a ratchet function.

FIG. 10 shows the mechanism of FIG. 9 with the ring 80 rotated slightly in a counterclockwise direction. The bent portion 102 of the spring rides up on the top of the next projection 108 until the member 81 has rotated to the next dispensing position, in which the spring end 102 snaps downwardly between adjacent projections 108. When this happens it creates an audible and tactile "click", which lets the user know that he or she has rotated the mechanism correctly to a new dispensing position.

It should be understood that in FIG. 10, the dimensions have been altered somewhat in order to illustrate the principles of the operation of this mechanism.

Typically, the rotation described above dispenses a predetermined amount of material, e.g., ¼ teaspoon.

The member 76 has a transverse wall with an arcuate hole 94. The hole 94 extends circumferentially somewhat less than 180° so that it covers three of the five compartments and leaves two compartments uncovered so as to refill those compartments. The compartment being emptied always is located underneath the wall to prevent the dispensing of any more material than is in one of the compartments.

The mechanism shown in FIGS. 8 through 12 is particularly advantageous in that the construction has a primary wear element, the spring 100, which is made of durable, tarnish-free stainless steel, and helps to insure long life for the dispensing mechanism.

Preferred Container

FIGS. 13 through 15 illustrate a preferred embodiment of the condiment dispensing container of the present invention.

FIG. 13 is an exploded view showing condiment container and dispenser 130. The container includes a hollow lower body portion 136 with a side wall 140 and a bottom wall 138, a top portion 134 and a cap structure 132.

The lower body portion 136 has an upper edge 142 recessed inwardly from the outer wall 140 of the container, with screw threads 144 which mate with similar screw threads (not shown) on the inside of the bottom edge of the top portion 134 so that the top portion can be screwed on to and off of the lower body portion 136. This allows access to the interior of the body 136 to refill the container, to dip out the contents with a measuring spoon, etc., through the open top formed by removal of the top portion 134.

The top portion 134 has an upper wall 146 and a side wall 148 with holes 150 in the side wall for use in dispensing materials from the container.

As it is shown in FIG. 14, as well as FIG. 13, the top portion 134 has detent structures 152 in opposite sides of the side wall 148. These structures cooperate with mating structures on the inside of the cap 132 to provide detents for different positions of the cap, and to guide the cap in its up and down motion.

As it is shown in FIGS. 14 and 15, the cap 132 has a top wall 158 with an outwardly extending upper rim 160 and a downwardly-extending flange 156 which forms a side wall for the cap.

The cap 132 has a cylindrical hollow interior 161 to receive the cylindrical upper portion 134 of the container body.

The cap has two ridges 162 on opposite sides of the inside surface of the cap, near its lower edge.

As it is shown in FIG. 15, the top 134 has two short circumferential grooves 154 adjacent to its bottom edge which are shaped to receive the ridges 162.

Referring to FIG. 14, each of the detent structures 152 has a short protruding circumferential ridge 155 with a short groove immediately beneath it.

The inside surface of the cap 132 has two opposed vertical grooves 164 (see FIG. 15) equal to the width of the detent structures 152.

Thus, the cap 132 is slidable up and down on the top portion 134 to open or close the dispensing outlet opening 150, with the grooves 164 guiding the cap's motion.

FIG. 14 shows the cap 132 in its lower-most position where the ridges 162 are seated in the recesses 154 to provide a discernible "click" as the cap 132 is pushed downwardly to its lower most position. This detent structure tends to hold the cap closed.

When the cap 132 is lifted to its upper-most position, the projections 162 fit into the groove in the upper detent structures 152 to provide a discernible "click" and to hold the cap in place on the top of the container so that it will not become separated from the container and possibly lost.

In its sliding motion, the projection surfaces 155 slide in the vertical grooves 164. These grooves help keep the cap 132 in a fixed alignment with the remainder of the body of the container.

The container shown in FIGS. 13 through 15 is a standalone container which can be placed on its bottom wall 138 on a table or other horizontal surface, in the manner of an ordinary salt or pepper shaker.

Alternatively, the top construction shown in these figures can be used with a dispensing container such as that shown in FIGS. 4-6 of the drawings, in which a measuring dispensing mechanism is located at the bottom end of the container to dispense pre-measured amounts of condiments.

The construction shown in FIGS. 13-15 is advantageous in that it is relatively uncomplicated to mold from plastic materials, and to assemble, and is relatively clean to use and maintain. The dispensing openings 150 are covered up when not in use so as to protect them from stray dust particles, liquids, etc., and yet the broad side walls and outwardly extending ridge 160 of the cap make it easy to grasp, and to pull up and push down.

The side wall 156 of the cap is tapered so that it is thicker at the top than it is at the bottom, as is shown in FIGS. 14 and 15. This facilitates hanging the containers from the arms of a carousel such as that shown in FIGS. 1, 2, etc.

Since the top portion 134 is of a smaller diameter than the outer surface of the bottom side wall 140, the side wall 156 of the cap merges smoothly with the side wall 140. Moreover, the condiments leave dispensing opening 150 in an almost straight downwardly descent towards a spoon, cup, or other receptacle so as to ensure that the pouring step is quick and neat.

Thus, the foregoing objects have been satisfied by the provision of the invention as described above.

The above description of the invention is intended to be illustrative and not limiting. Various changes or modifications in the embodiments described may occur to those skilled in the art. These can be made without departing from the spirit or scope of the invention.

What is claimed is:

1. A condiment container with a retractable pouring structure, said container comprising
    a housing body having at least one side wall, a bottom portion and a top portion, a pouring structure having a slider structure with a cap, said slider structure being shaped and dimensioned to slidably fit on said top portion so as to be slidable towards and away from said body,
    one of said top portion and said slider structure having a dispensing opening said pouring structure causing said dispensing opening to be unblocked when said slider structure is positioned away from said body, and causing said opening to be blocked when said slider structure is positioned towards said body, in which said housing side wall has a rotary lower portion mounted to rotate about the longitudinal axis of said housing,
    a measuring dispensing mechanism in said housing and a dispensing opening in said lower portion,
    means for drivably coupling said rotary lower portion of said housing to said dispensing mechanism,
    whereby pre-determined quantities of a condiment can be dispensed through the bottom of said housing by rotating said lower portion.

2. A condiment container comprising
    a hollow, elongated, substantially cylindrical body member forming a housing having two ends, a top portion at one end, and a bottom portion at the other end, and a first side wall,
    a cap with a second side wall dimensioned to slide longitudinally on said top portion of said body member,
    a dispensing opening in one of said top portion of said first side wall and said second side wall,
    said top portion of said first side wall and said second side wall being adapted to slidably engage one another with said cap movable upwardly and downwardly when said container is upright, so that said opening is closed when said cap is at its lowermost position and is open when said cap is at its uppermost position, said housing having a rotary lower portion mounted to rotate about the longitudinal axis of said housing,
    a measuring dispensing mechanism in said housing and a dispensing opening in said lower portion,
    means for drivably coupling said rotary lower portion of said housing to said dispensing mechanism,
    whereby pre-determined quantities of a condiment can be dispensed through the bottom of said housing by rotating said lower portion.

3. A container as in claim 2 in which said opening is in said first side wall of said upper portion, and said second side wall embraces said first side wall of said upper portion and is in close proximity to said first side wall.

4. A container as in claim 3 in which said top portion has an upper wall closing said hollow body member at the top.

5. A container as in claim 2 in which said opening is in said second side wall, and said second side wall slides inside of said first side wall, and said top portion is open at the top.

6. A container as in claim 2 in which said container has a top portion whose diameter is larger than that of said lower portion of said body member.

7. A container as in claim 2 in which said first side wall in said top portion has a closed top and a diameter substantially smaller than that of said lower portion,
    said dispensing opening being located in said top portion side wall,
    said cap having an outwardly-extending portion having a larger diameter than said lower body portion,
    said top portion being detachably secured to said lower body portion and having a top wall and a dispensing opening in its side wall,
    said second side wall of said cap being of a diameter slightly greater than that of said top portion, and a detent structure between said cap and said top portion to hold said cap in either an extended or a depressed position.

* * * * *